June 5, 1962  H. J. RICHMAN, JR  3,037,794
HITCH FOR VEHICLES
Filed Nov. 16, 1959  4 Sheets-Sheet 3
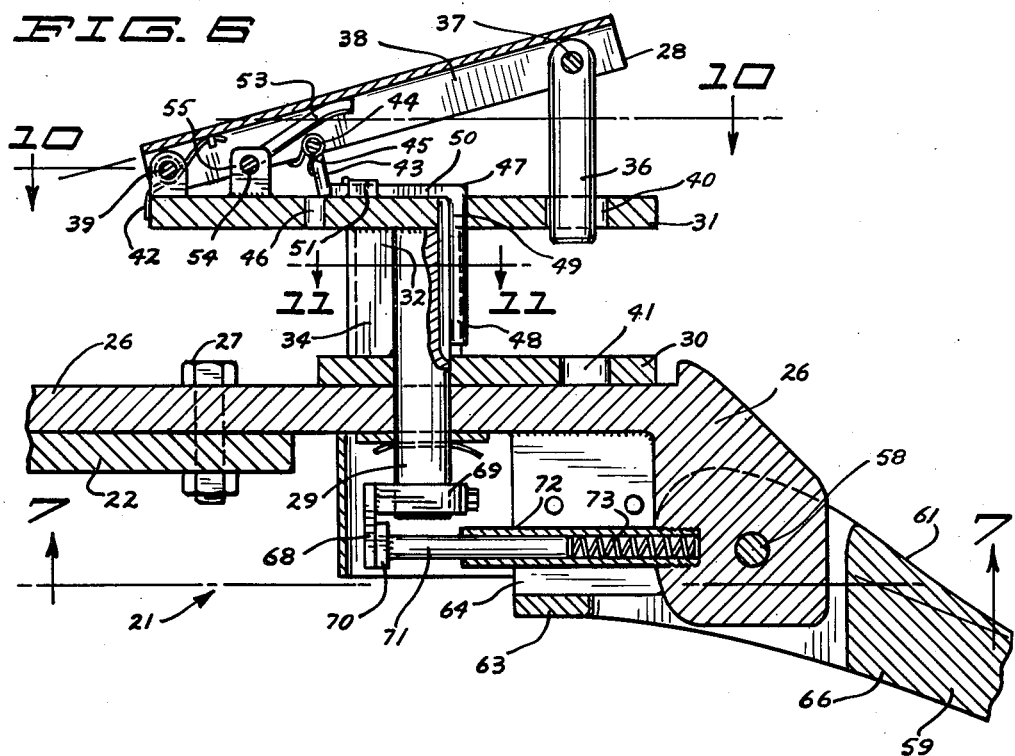
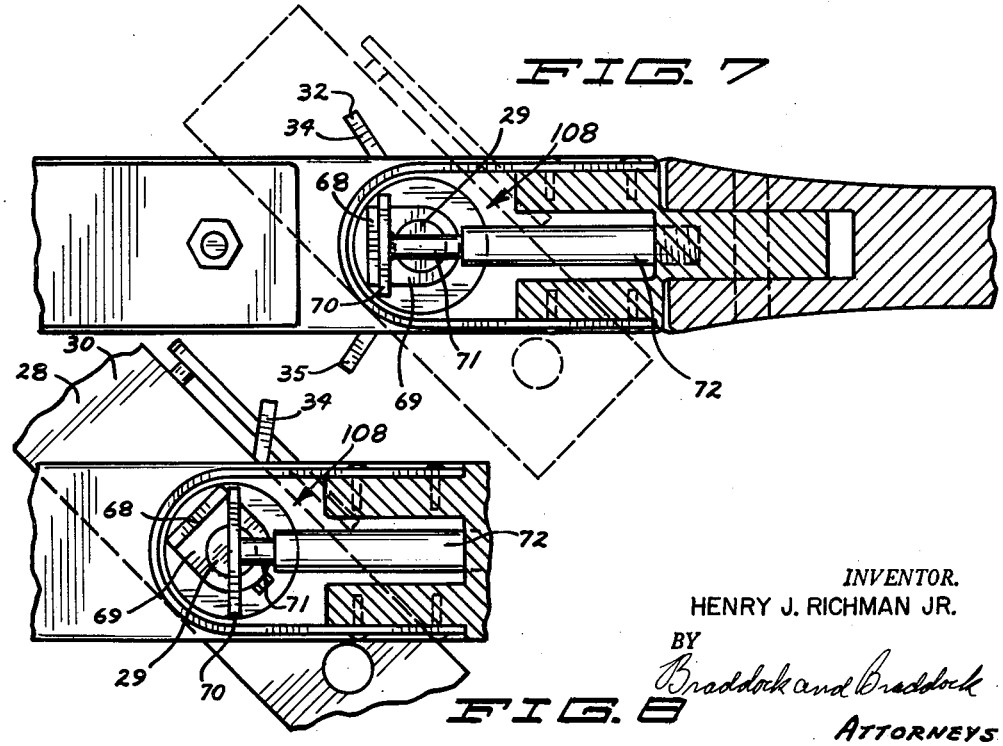
INVENTOR.
HENRY J. RICHMAN JR.
BY
Braddock and Braddock
ATTORNEYS

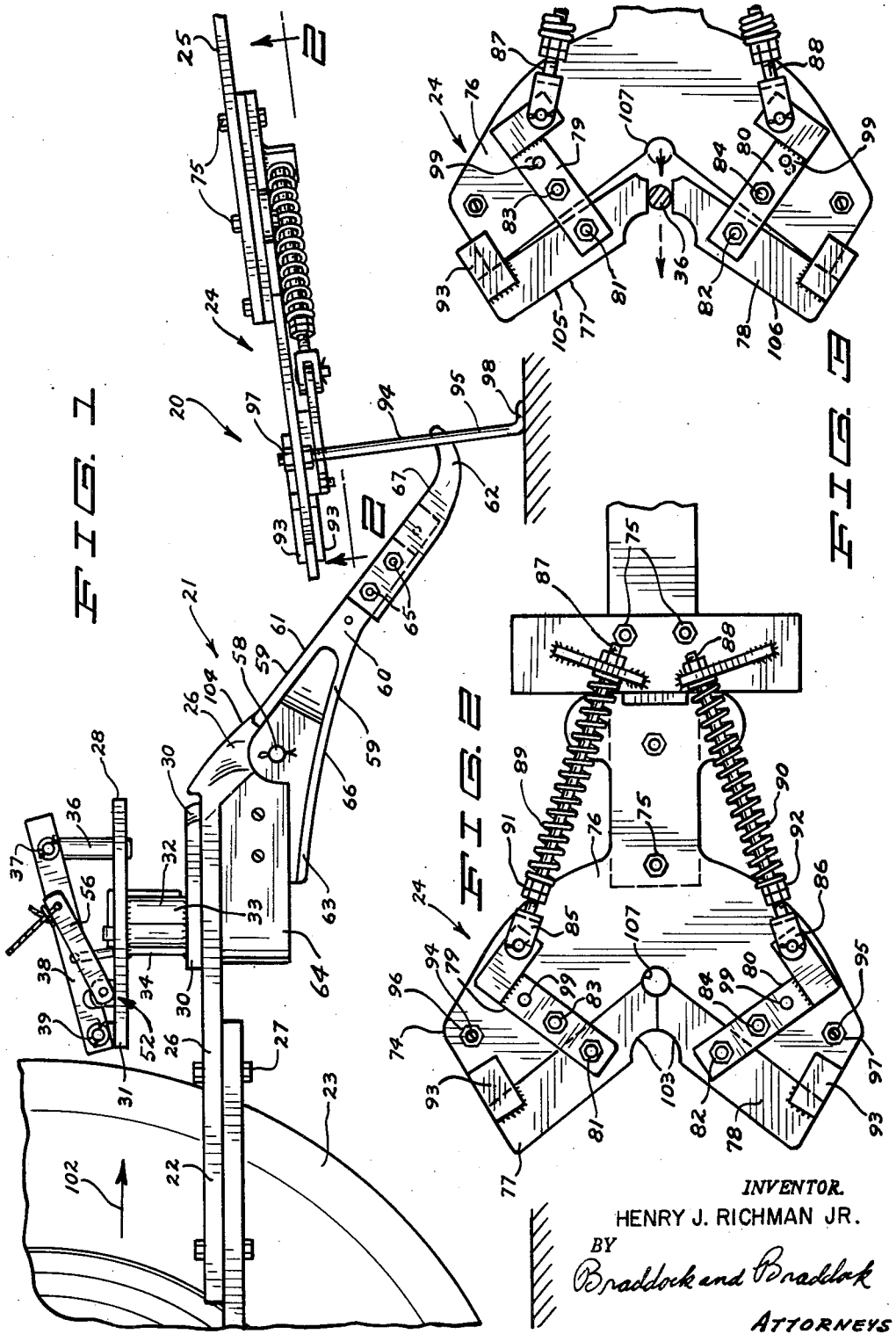

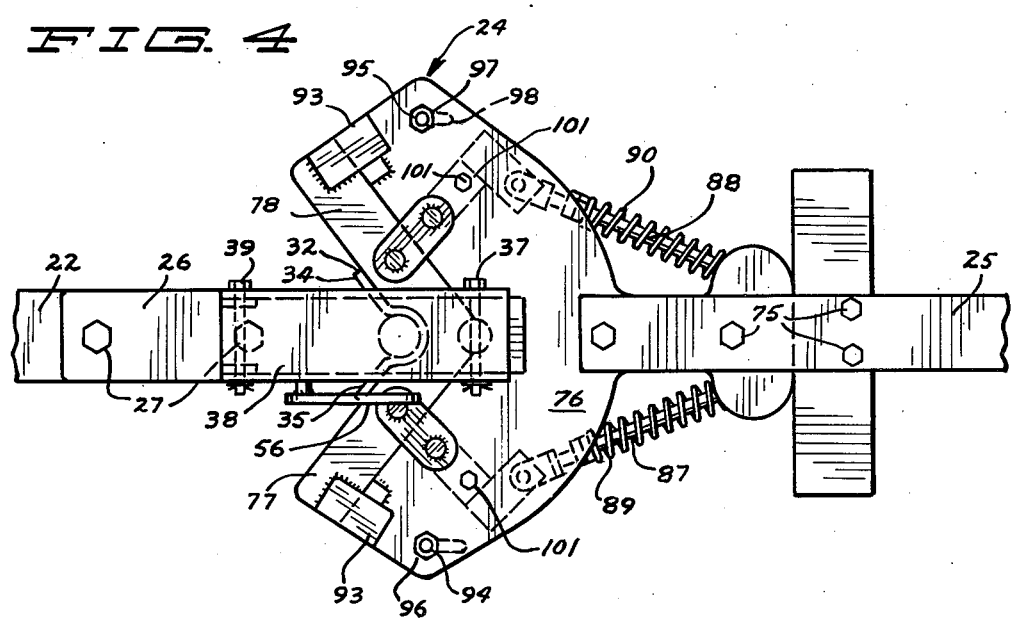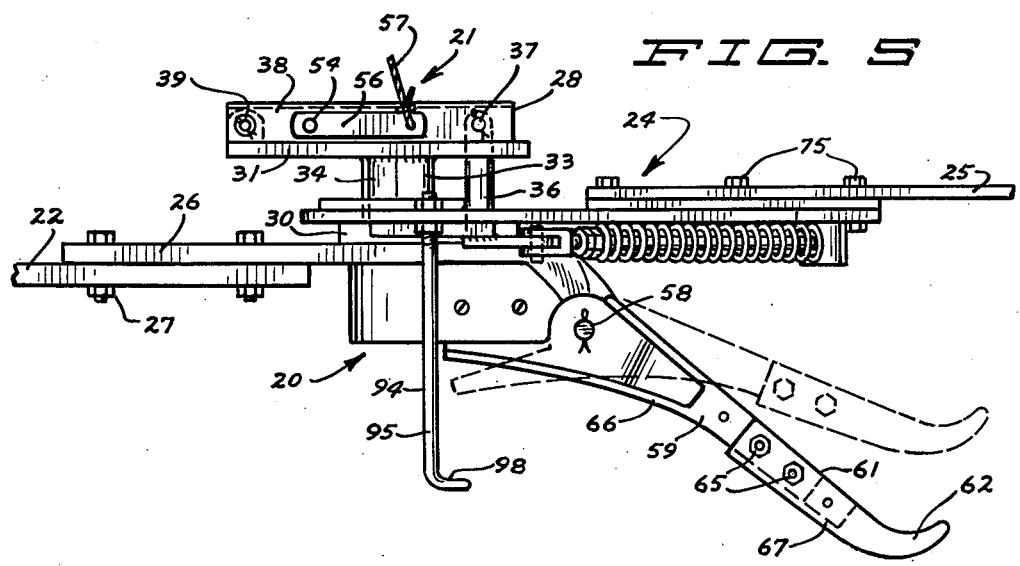

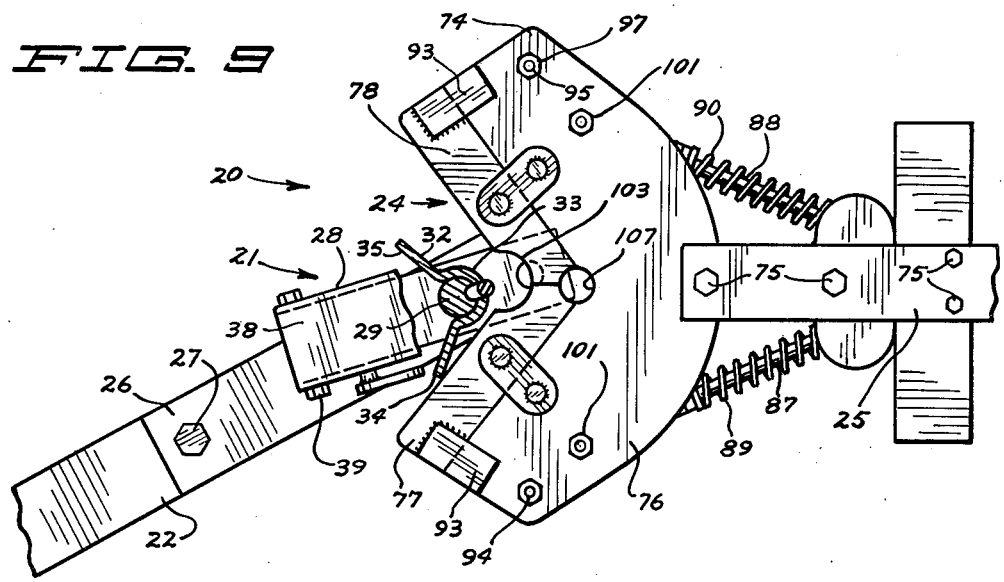
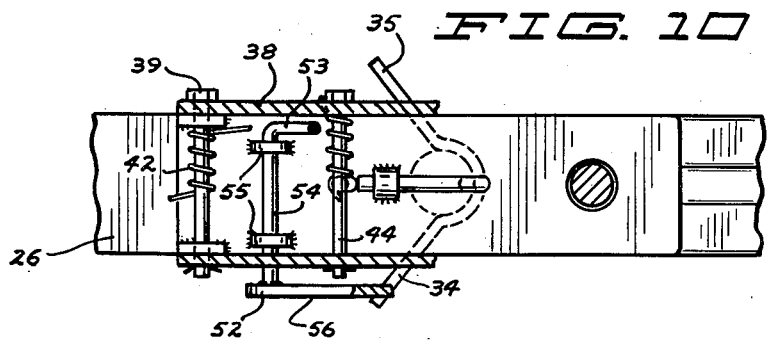

United States Patent Office 3,037,794
Patented June 5, 1962

3,037,794
HITCH FOR VEHICLES
Henry John Richman, Jr., Tower City, N. Dak.
Filed Nov. 16, 1959, Ser. No. 853,149
10 Claims. (Cl. 280—449)

This invention has relation to coupling mechanism adapted to be associated with the draw-bar of a vehicle and with the tongue of an implement or trailer to be attached to said vehicle. More particularly, the invention relates to mechanism which will be effective to normally maintain the trailer tongue in coupled relation to the vehicle drawbar; but which will automatically become uncoupled when excessive tensile stress develops between said drawbar and said tongue; and which is capable of rapidly and automatically coupling said drawbar and tongue when the vehicle mounted portion of the mechanism is backed toward and into the tongue mounted portion thereof.

Certain features of the present invention were first disclosed in my co-pending patent application for Automatic Coupling Trailer Hitch, Serial No. 751,045, filed July 25, 1958, now abandoned, and my co-pending patent application for Remotely Controlled Trailer Hitch and Stand, Serial No, 657,648, filed May 7, 1957, now Patent No. 2,937,887.

A device of the invention is particularly useful in connection with use of multiple bottom plows. When a tractor is used to pull such plows, it is essential that some kind of mechanism be used between the tractor draw bar and the tongue of the implement so that the excessive stresses which develop when the plow hits a rock, stump or other obstruction may be instantly relieved before damaging the tractor and/or the plow. In the present case, the decoupling mechanism is relied upon to release the plow tongue from the tractor draw bar. The tractor must then be recoupled to the implement tongue. Then power from the tractor can be applied more evenly and slowly to overcome the resistance encountered by pushing the rod, stump or the like to one side.

An object of the invention is to provide for means whereby the implement tongue and tractor draw bar can be rapidly coupled without necessity of the operator climbing down from the tractor.

In the drawings,

FIG. 1 is a side elevational view showing the relationship of the drawbar mounted coupling portion of the mechanism with respect to the tongue mounted decoupling portion of the mechanism when these two portions are disassociated from each other but in position to accomplish automatic coupling;

FIG. 2 is a bottom plan view taken on the line 2—2 in FIG. 1 showing the tongue mounted parts in their normal position;

FIG. 3 is a fragmentary view of the mechanism disclosed in FIG. 2 but with the parts in position as they would appear when the mechanism was becoming decoupled due to excessive stress between the tractor drawbar and the trailer tongue;

FIG. 4 is a top plan view of a fragment of a vehicle drawbar and of a trailer tongue and of the mechanism of the invention in the coupled position;

FIG. 5 is a side elevational view of the mechanism of FIG. 4;

FIG. 6 is an enlarged vertical sectional view of the drawbar and of the drawbar mounted portion of the mechanism of FIG. 1;

FIG. 7 is a horizontal sectional view taken on the line 7—7 in FIG. 6;

FIG. 8 is a fragmentary horizontal sectional view of a portion of the mechanism seen in FIG. 7 but with the parts positioned as they would appear when in the act of coupling the tongue to the drawbar when the tongue is situated in other than longitudinal relationship to the drawbar;

FIG. 9 is a top plan view of the apparatus of the parts in section and parts broken away, showing the relationship of the parts when the drawbar backs into the tongue in other than longitudinally aligned relationship therewith;

FIG. 10 is a horizontal sectional view taken on line 10—10 in FIG. 6; and

FIG. 11 is a horizontal sectional view taken on the line 11—11 in FIG. 6.

Referring now to the drawings and the numerals of reference thereon, an automatic coupling and decoupling trailer hitch is denoted generally at 20 and consists of coupling mechanism generally denoted 21 and mounted on a drawbar 22 of a tractor or other suitable vehicle 23 as well as a decoupling mechanism denoted generally at 24 mounted on a tongue 25 of any vehicle or implement which is to be towed or trailed behind the tractor.

The coupling mechanism 21 includes a main casting 26 which is bolted to the drawbar 22 as at 27. A coupling pin carrying assembly 28 includes a pivot pin 29 which is rotatably supported in said casting 26, a lower plate 30 having a lower surface thereof in bearing, sliding, pivoting relationship to an upper surface of said main casting, and an upper plate 31 parallel to and spaced from said lower plate 30. A guide and positioning plate 32 has a part cylindrical portion 33 located in concentric relationship to said pivot pin 29 between said upper and lower plates, and a pair of aligning wings 34, 35 integral with and extending generally radially outwardly from said part-cylindrical portion 33 of said positioning plate.

A coupling pin 36 is pivotally mounted as at 37 to a carrier 38 which in turn is pivotally mounted as at 39 with respect to said upper plate 31 of said coupling pin supporting assembly 28.

This coupling pin 36 extends through an opening 40 in said upper plate 31 and is in alignment with an opening 41 in said lower plate 30 of said coupling pin supporting assembly 28. A coil spring 42 around pivot post 39 normally urges said carrier 38 to move in direction toward said upper plate 31 to carry said coupling pin 36 through said opening 41 in the lower plate 30. A locking rod 43 is pivotally mounted as at 44 with respect to the coupling pin carrier 38, and a coil spring 45 acting on the locking rod 43 and the carrier 38 tends to cause the locking rod to rotate in counterclockwise direction as seen in FIG. 6, for example. An opening 46 in upper plate 31 is provided to receive the locking bar 43 when it is in substantially perpendicular relationship to said upper plate. A trigger 47 includes a trigger bar 48 extending vertically downwardly through an opening 49 in upper plate 31, as well as a sear bar 50 integral with and extending perpendicularly from said trigger bar at position immediately above the upper plate 31. Said sear bar is maintained to be in longitudinal relationship to the coupling pin supporting assembly 28 and in aligned contacting relationship to locking rod 43 through the instrumentality of a guide tunnel 51.

A carrier cocking assembly 52 includes a cocking arm 53 positioned to have an outer end thereof in contacting relationship with an under surface of said coupling pin carrier 38 at position spaced from said pivotal connection between said carrier and the upper plate 31. This cocking assembly 52 also includes a horizontally extending cocking rod 54 pivotally mounted with respect to and spaced above said upper plate 31 on ears 55, 55 integral with said cocking rod; and a cocking handle 56 integral with said cocking rod 54 at right angles thereto. Said cocking handle can have a flexible or other suitable control line 57 extending from an outer end of said handle to location adjacent a tractor operator.

Depending from an outer end portion of the main casting 26 and pivotally mounted thereon as at 58 is an elevating ramp 59. This ramp includes an elongated shank 60 having a smooth ramping surface 61 obliquely disposed with reference to the ground and defining an upper surface of said shank. This ramp also includes at its outer lower end thereof a shoe 62; and at its upper end a stop member 63 situated to come into contact with a bottom portion 64 of the main casting 26 to prevent further downward rotation of the elevating ramp 59 about the pivot 58 when the ramp is in its normal operating position as seen in full lines in FIG. 5 and as seen in FIGS. 2 and 6.

The elevating ramp 59 as shown is in two pieces, the break coming at an intermediate portion of the shank 60. An upper section 66 of the ramp 59 is adjustably connected to a lower section 67 thereof through the instrumentality of fastening means 65. This adjustment is desirable for regulating the height of the shoe 62 from the ground. In installing the coupling mechanism 21 on a draw bar 22 of a particular height the shoe 62 of the ramp 59 need be positioned as close as possible to the ground consistent with the fact that it must at all times either be positioned above the ground or skid along the ground when the tractor is backed up; and taking into account the fact that the tractor will often be backed over rough ground and down into and out of ditches and other depressions. The length of the ramp is varied to achieve proper positioning of shoe 62.

Depending below the main casting 26 and mounted therein is centering mechanism 108 for normally situating the coupling pin supporting assembly 28 in longitudinal alignment with the main casting 26. This mechanism 108 includes a flat supporting assembly alignment plate 68 integral with a collar 69 which in turn is keyed to a lower end portion of the pivot pin 29 below the main casting 26. This plate 68 is situated to be in perpendicular relationship to the longitudinal axis of the tractor draw bar 22 and the main casting 26 when the supporting assembly 28 is longitudinally aligned with said draw bar and casting. An aligning bar 70 is situated to exert an aligning force on alinement plate 68 and is integral with a push rod 71 which in turn is mounted in a cylinder 72 integral with and extending rearwardly from the casting 26. A coil spring 73 acting against the casting and on an end of the push rod 71 spaced from the aligning bar 70 causes the push rod to cause the bar 70 to exert a centering force on the alignment plate 68 as perhaps best seen in FIG. 8.

The decoupling mechanism 24 includes a main yoke 74 which is fastened to the tongue 25 of the implement or trailer to be towed through the instrumentality of bolts 75. This yoke 74 includes a flat sheet 76 of yoke-shaped configuration and a pair of coupling pin retaining and release plates 77 and 78 situated in the same plane as the flat sheet 76 to normally be in contiguous relation thereto. Said retaining plates 77 and 78 are each pivotally connected to one of a pair of tensioning arms 79 and 80 as at 81 and 82; and said tensioning arms are pivotally supported with respect to the flat sheet 76 as at 83 and 84 respectively. Extension of said arms 79 and 80 at ends thereof opposite the pivotal connection to the plates 77 and 78 support fittings 85 and 86 which in turn receive thrust from rods 87 and 88 respectively. These rods receive their thrust from compression springs 89 and 90 which can be adjusted for strength by changing the position of nuts 91 and 92 on the rods 87 and 88 respectively.

Each of said retaining plates 77 and 78 has a pair of positioning ears 93, 93 extending outwardly therefrom to be slidably situated on upper and lower faces of the sheet 76.

Supporting legs 94 and 95 are bolted to the flat sheet 76 as at 96 and 97 respectively, and each includes a foot 98 situated to be in contacting relationship to the ground and extending in direction toward the rear of the trailer.

The tensioning arms 79 and 80 are each provided with an opening 99 therethrough, and the main yoke 74 is provided with a pair of openings 100, 100 lying in aligned relationship with the openings 99, 99 when the retaining plates 77 and 78 are positioned as seen in FIGS. 2, 4 and 9. A pair of preventing pins 101, 101 may be extended through these openings 99 and 100 to prevent retaining and release plates 77 and 78 from having any relative movement with respect to the flat yoke-like sheet 76. By way of illustration, one of these pins 101 is shown in its preventing position at the top of FIG. 4.

*Operation*

The respective positioning of the coupling mechanism and decoupling mechanism of the invention just prior to the coupling or recoupling is illustrated most clearly perhaps in FIG. 1. The tractor as shown in that figure will be caused to move in a backward direction as indicated by the arrow 102, and this will cause the smooth ramping surface 61 of the shank 60 to come in contact with the outer diagonal leading edge of either the retaining plate 77 or the retaining plate 78. As these plates tend to move up the ramping surface 61 of the shank 60, the weight of the tongue will be lifted from the feet 98 of the supporting legs 95, 95 and the tongue will then be free to move about its pivotal connection to the implement (not shown) to allow the ramping surface of the shank 60 to move into a cutaway cylindrical portion 103, 103 of each of the plates 77 and 78 as the main yoke 74 is elevated by said ramping surface 61 and moves relatively in direction toward the coupling mechanism 21.

It is to be expected that many times the draw bar of the trailer will not be in exact longitudinal alignment with the principal axis of the trailer tongue. When the parts are not so aligned, as the main yoke is elevated up past the ramp 59 and over a main casting ramping surface 104 to have position between the lower plate 30 and the upper plate 31 of the coupling pin supporting assembly 28, the parts may assume some such position as is illustrated in FIG. 9. As seen in this figure, a forward edge 105 of retaining plate 77 has contacted an outer edge of aligning wing 44 of the guide end positioning plate 32 and this contact has forced the coupling pin supporting assembly 28 to rotate about pivot pin 29 as shown. As the tractor draw bar moves further in direction toward the yoke 74, it will be seen that the part-cylindrical portion 33 of the guide end positioning plate 32 will be brought into contacting position with the cylindrical portions 103, 103 of the plates 72 and 78, and the entire outer surface of each of the aligning wings 34 and 35 will be brought into contiguous relationship to forward edges 105 and 106 of retaining plates 77 and 78 respectively. When this point is reached, the configuration of the parts is such that the openings 40 and 41 in the upper and lower plates 31 and 30 respectively, will be in alignment with a coupling pin receiving opening 107 in the main yoke 74, which opening is bounded by the flat sheet 76, and retaining release plates 77 and 78.

This movement of the coupling mechanism into contact with the main yoke 74 as described will also cause the trigger bar 48 of the trigger 47 to be moved in direction toward the axis of coupling pin supporting assembly pivot pin 29, which motion will cause the sear bar 50 of said trigger to press the locking rod 43 into alignment with the opening 46 in the upper plate 31.

When this has been accomplished, the carrier 38 is free to rotate about pivot 39 and, under the influence of coil spring 42, cause the coupling pin 36 to pass downwardly through the coupling pin receiving opening 107 in the yoke 74 and into the opening 41 in the lower plate 30. At this point, of course, the tongue of the implement is coupled to the draw bar of the tractor.

When the tractor moves forward in a straight line, the coupling pin supporting assembly 28 and consequently the main yoke 74 and the implement tongue 25 will become aligned with the tractor draw bar. When, however, the tractor departs from a straight course, the coupling pin supporting assembly 28 and the main yoke 74 will pivot as a unit about pivot pin 29.

When the implement being towed by the tractor is a plow, for example, it is to be expected that, as the tractor moves forward at a normal plowing speed, sooner or later certain obstructions will be encountered by the plow. Because of the power being exerted and because of the momentum of the tractor, extremely large stresses are built up between the tractor tow bar and the tongue of the implement. These stresses must be instantaneously relieved or very serious damage is likely to occur to the equipment. The function of the decoupling mechanism is, therefore, to allow the coupling pin 36 to be decoupled from the main yoke 74 upon occurrence of stresses above a predetermined value.

The retaining and release plates 77 and 78 are maintained in contiguous contacting position with the flat sheet 76 of the yoke 74 through the instrumentality of the pressure exerted by compression coil springs 89 and 90. In other words, the continuity of coupling pin receiving opening 107 will be maintained only so long as the force exerted by these springs 89 and 90 is sufficient to overcome the force of the coupling pin 36 on the plates 77 and 78. When this coupling pin force exceeds the ability of springs 89 and 90 to prevent movement of the plates, the plates will become positioned as seen in FIG. 3, and the tractor together with its draw bar, its coupling mechanism and most particularly, the coupling pin 36 will become decoupled from the decoupling mechanism 24. For clarity of illustration, all parts of the draw bar mounted mechanism have been omitted from FIG. 3 with the exception of the pivot pin 36.

It is of course, desirable that the mechanism of the invention become decoupled only when entirely necessary to prevent damage due to overload of the parts. Accordingly, the force exerted by the springs 89 and 90 tending to keep the mechanism coupled together is desirably maintained as high as possible consistent with the safety of the apparatus. On the other hand, the strength of the implement being drawn by the tractor and, consequently, the likelihood of damage to the parts of the implement due to sudden shocks varies from implement to implement. The release pressures must, of course, be such that decoupling will occur before the danger point for a particular implement is reached. For this reason, it is desirable that the pressure or the stress necessarily present before the mechanism will become decoupled be readily adjustable. This is provided for by changing the positioning of nuts 91 and 92 on the rods 87 and 88. The farther that the springs 89 and 90 are compressed by these nuts, the greater will be the force necessary to decouple the draw bar from the tongue.

In many instances, the mechanism of the invention will be utilized throughout an entire use cycle without automatic decoupling taking place. In this situation and whenever it is desired to decouple the tongue from the draw bar, the control line 57 will be used to elevate the manual release or cocking handle 56. This handle will be rotated about the cocking rod 54 to cause the release and cocking arm 53 to bear against the underside of the carrier 28 to elevate the pivot pin 36 to position as seen in FIG. 6 and then, consequently, to release the yoke 74 from the coupling mechanism 21.

As this happens, the spring 45 on pivot 44 will cause the locking bar 43 to rotate in counterclockwise direction as seen in FIG. 6 out of alignment with the opening 46 to position in alignment with a portion of the top surface of the upper plate 31, thus pushing the sear bar 50 and the trigger bar 48 of the trigger 47 to position as seen in that figure. The control line 57 then will be slacked off by the operator and the locking rod 43 will prevent the carrier 38 from allowing the pivot pin 36 to move down again. In other words, the coupling mechanism will remain cocked to allow pickup of the same or a similar implement.

As the tractor and consequently the draw bar are backed toward a trailer tongue for pick up, the conditions will seldom be as ideal as those pictured in FIG. 1. In most instances, the ground will not be entirely level between the tractor and the trailer and, consequently the shoe 62 on the end of the elevating ramp 59 may be spaced either higher or lower with respect to the ground under the yoke 74 depending upon the terrain. In many instances, for example when the tractor drives forward or backs down into a hollow and where the hollow rises abruptly on the far side, the shoe 62 can actually come in contact with ground. This can be in proximity to a yoke 74 preparatory to pickup or can be anytime during the normal operation of the tractor. For this reason, it is essential that provision be made for allowing the ramp to pivot with respect to the main casting 26 and consequently with respect to the tractor draw bar. If such provision is not made, it can be expected that the outer end of the ramp 59 will dig into the ground or be forced into the ground and will be caused to break off or will cause severe damage to the draw bar or to the mechanism in general.

By the same token, it is not generally satisfactory to fixedly position the ramp at a higher level when operating on an entirely flat surface than the level depicted in FIG. 1 since any higher positioning might allow the outer end of the elevating ramp to pass above the yoke 74 where the yoke to be supported on relatively low ground while the tractor stood on relatively higher ground.

To meet the requirements for relatively low positioning of the outer end of the elevating ramp 59 and protection of the ramp against damage in the event the ramp touches the ground, the pivoted construction and the shoe 62 were developed.

When conditions are such that the shoe 62 touches the ground, subsequent reverse motion of the tractor will be accompanied by the sliding of the shoe over the ground, and subsequent lowering of the tractor draw bar and accordingly the pivot 58 will cause a relative motion between the main casting 26 and the elevating ramp to some such position as shown in dotted lines in FIG. 5. Since the shoe 62 is at this time resting on the ground, and since the feet 98 extending outwardly from the legs 94 and 95 are also resting on the ground, it is clear that the elevating ramp will pass beneath the yoke 74 so that a proper pick up can be made.

In order that the angle of approach of the axis of the draw bar with respect to the axis of the trailer tongue can be the maximum possible on each side of the trailer axis, the centering mechanism 108 for the coupling pin supporting assembly is desirable. This assembly as already described, includes the aligning plate 68 fixedly mounted and spaced from the axis of pivot pin 29 and the aligning bar 70 mounted for movement perpendicular to the desired axis of alignment of said supporting assembly together with resilient means to constantly force the aligning bar 70 to exert an aligning pressure on the alignment plate 68. When the pickup of a trailer or implement tongue is made from an angle or when the tractor turns from the path on which the trailer is headed, the coupling pin supporting assembly will rotate to cause the alignment plate to force the aligning bar into the cylinder 72 against the action of spring 73.

When, however, the tongue is decoupled from the draw bar, the parts will be forced by the aligning bar 72 to position as seen for example in full lines in FIG. 7.

What is claimed is:

1. The combination with a vehicle having a drawbar extending from the rear thereof and a trailer having a forwardly extending tongue capable of swinging movement in a vertical plane; of: an automatic coupling trailer hitch consisting of a coupling mechanism mounted on said drawbar and a coupling receiving mechanism mounted on said tongue; said coupling mechanism including a positioning member, a coupling pin, trigger means responsive to movement of the coupling receiving mechanism into contiguous, contacting relationship with said positioning member for moving said coupling pin into engagement with said coupling receiving mechanism, a ramp pivotally mounted at a first end thereof with respect to said drawbar and extending downwardly and rearwardly of said vehicle to terminate at a second end thereof at a predetermined position normally above the ground, and stop means limiting downward pivotal movement of said ramp with respect to said drawbar; said coupling receiving mechanism including a main yoke lying in a plane perpendicular to said coupling pin when said trailer and said vehicle are hitched, said yoke having a leading edge constituted as a part-cylindrical portion and a pair of forwardly and outwardly extending plane portions thereof, said main yoke being provided with a coupling pin opening to be in aligned relation to said coupling pin when said part-cylindrical portion of said leading edge of said yoke is in contacting relation to said positioning member, and a supporting foot extending downwardly from said main yoke to support said leading edge thereof in spaced relationship to the ground at a height above the predetermined normal position of said second end of said ramp.

2. An automatic decoupling trailer hitch for coupling a trailer to a towing vehicle and for automatically decoupling said trailer from said vehicle upon application of a predetermined tensile stress overload therebetween, said hitch consisting of a coupling mechanism mounted on the rear of said tractor and having a coupling pin, a trailer tongue extending forwardly of said trailer, a decoupling mechanism attached at an end of said tongue opposite said trailer, said decoupling mechanism including a flat sheet lying in a plane perpendicular to said coupling pin when said trailer and vehicle are hitched together and first and second release plates each lying in the plane of said sheet in contiguous relation to each other along a plane passing through said coupling pin, each plate being contiguous to said sheet along a forward edge of said sheet, a coupling pin opening being provided for reception of said coupling pin at the mutual intersection of said first and said second release plates and said sheet, and resilient means urging said plates in direction to tend to resist displacement by said coupling pin when said pin is in said pin opening and said vehicle is exerting a pull on said trailer tongue through said hitch.

3. An automatic decoupling trailer hitch for coupling a trailer to a towing vehicle and for automatically decoupling said trailer from said vehicle upon application of a predetermined tensile stress overload therebetween, said hitch consisting of a coupling mechanism mounted on the rear of said tractor and having a coupling pin, a trailer tongue extending forwardly of said trailer, a decoupling mechanism attached at an end of said tongue opposite said trailer, said decoupling mechanism including a flat sheet lying in a plane perpendicular to said coupling pin when said trailer and vehicle are hitched together and first and second release plates each lying in the plane of said sheet in contiguous relation to each other along a plane passing through said coupling pin, each plate being contiguous to said sheet along a forward edge of said sheet, a coupling pin opening being provided for reception of said coupling pin at the mutual intersection of said first and second release plates and said sheet, a tensioning arm attached to each of said plates and pivotally mounted for movement with respect to said sheet, and resilient means urging said tensioning arms in direction to tend to cause said plates to resist displacement by said coupling pin when said pin is in said pin opening and said vehicle is exerting a pull on said trailer tongue through said hitch.

4. The combination with a vehicle having a drawbar extending from the rear thereof and a trailer having a forwardly extending tongue capable of swinging movement in a vertical plane; of: an automatic coupling trailer hitch consisting of a coupling mechanism mounted on said drawbar and a coupling receiving mechanism mounted on said tongue; said coupling mechanism including a pivot pin extending vertically and perpendicularly from said drawbar, a guide plate having a part-cylindrical portion pivotally mounted to be concentric with said pivot pin and a pair of outwardly and forwardly extending radial aligning wings integral with said part-cylindrical portion, a base member lying in a horizontal plane and integral with said guide plate, a carrier member mounted with respect to said base member to have movement in a vertical plane, a coupling pin secured to said carrier member, said base member having an aperture through which said coupling pin is adapted to move, resilient means reacting on said carrier member and applying a force to said carrier member in direction to project said coupling pin in one direction, locking means for holding said carrier in a cocked position, trigger means responsive to movement of said coupling receiving mechanism into contiguous, contacting relationship with both aligning wings and the part-cylindrical portion of said guide plate for releasing said locking means to release said resilient means to forcibly move said carrier and coupling pin with said coupling pin moving through said aperture to engage with said coupling receiving mechanism, reset means for moving said coupling pin in opposite direction and moving said carrier into said cocked position, a ramp pivotally mounted at a first end thereof with respect to said drawbar and extending downwardly and rearwardly of said vehicle to terminate at a second end thereof at a predetermined position normally above the ground, and stop means limiting downward pivotal movement of said ramp with respect to said drawbar; said coupling receiving mechanism including a main yoke lying in a plane perpendicular to said coupling pin when said trailer and said vehicle are hitched, a leading edge of said yoke being of configuration to exactly meet and match with a following edge of each of said aligning wings and of said part-cylindrical portion of said guide plate, said yoke being provided with a coupling pin opening in position to be in aligned relationship to said coupling pin when said leading edge of said yoke is in complete, contacting relationship to said following edge of said guide plate, and a supporting foot extending downwardly from said main yoke to support said leading edge thereof in spaced relationship to the ground at a height above the predetermined normal position of said second end of said ramp.

5. The combination as specified in claim 4 wherein the coupling mechanism is provided with a resilient centering mechanism operative to tend to rotate said guide plate to position said aligning wings in symmetrical relationship with respect to a longitudinal axis of said drawbar.

6. The combination with a vehicle having a drawbar extending from the rear thereof and a trailer having a forwardly extending tongue capable of swinging movement in a vertical plane; of: an automatic coupling and decoupling trailer hitch consisting of a coupling mechanism mounted on said drawbar and a decoupling mechanism mounted on said tongue; said coupling mechanism including a pivot pin extending vertically and perpendicularly from said draw bar, a guide plate having a part-cylindrical portion pivotally mounted concentric with said pivot pin and a pair of outwardly and forwardly extending radial aligning wings integral with said part-cylindrical portion, a base member lying in a horizontal plane and integral with said guide plate, a carrier member mounted with respect to said base member to have movement in a vertical plane, a coupling pin secured to said carrier member, said base member having an aperture through which said coupling pin is adapted to move, a spring reacting on said carrier member and applying a force to said carrier member in a direction to project said coupling pin in one direction, locking means for holding said carrier in a cocked position, trigger means responsive to movement of the decoupling mechanism into contiguous, contacting relationship with both aligning wings and the part-cylindrical portion of said guide plate for releasing said locking means to release said spring to forcibly move said carrier member and coupling pin with said coupling pin moving through said aperture to engage with the decoupling mechanism, reset means for contacting said carrier to move said coupling pin in opposite direction to move said carrier into said cocked position, a ramp pivotally mounted at a first end thereof with respect to said drawbar and extending downwardly and rearwardly of said vehicle to terminate at a second end thereof at a predetermined position normally above the ground, and stop means limiting downward pivotal movement of said ramp with respect to said drawbar; said decoupling mechanism including a main yoke lying in a plane perpendicular to said coupling pin when said trailer and vehicle are hitched and having a flat sheet fixedly mounted on said tongue and first and second retaining plates in contiguous, contacting relation to each other along a plane passing through said coupling pin, each retaining plate lying in contiguous, contacting relation to a forward edge of said sheet, a leading edge of said yoke being of configuration to exactly meet and match with a following edge of each of said aligning wings and of said part-cylindrical portion of said guide plate, one half of said leading edge being provided by each of said retaining plates, a coupling pin opening being provided in said yoke at the mutual intersection of said first and second retaining plates and said flat sheet to be in aligned relation to said coupling pin when said leading edge of said yoke is in complete, contacting relation to said following edge of said guide plate, a tensioning arm attached to each of said retaining plates and moveably mounted on said sheet, resilient means urging said tensioning arms in direction to cause said plates to tend to resist displacement by said coupling pin when said pin is in said pin opening and said vehicle is exerting pull on said trailer tongue through said hitch, and a supporting foot extending downwardly from said main yoke to support said leading edge thereof in spaced relationship to the ground at a height above the predetermined normal position of said second end of said ramp.

7. The combination as specified in claim 6 wherein said coupling mechanism is provided with a resilient centering mechanism to tend to position a longitudinal axis of said base member to be in parallel alignment to the longitudinal axis of said vehicle thus to position said aligning wings of said guide plate in symmetrical relationship to said longitudinal axis.

8. The combination with a vehicle having a drawbar extending from the rear thereof and a trailer having a forwardly extending tongue capable of swinging movement in a vertical plane; of: an automatic coupling and decoupling trailer hitch consisting of a coupling mechanism mounted on said drawbar and a decoupling mechanism mounted on said tongue; said coupling mechanism including a pivot pin extending vertically and perpendicularly from said drawbar, a guide plate having a part-cylindrical portion pivotally mounted to be concentric with said pivot pin and a pair of outwardly and forwardly extending radial aligning wings integral with said part-cylindrical portion, a base member lying in a horizontal plane and integral with said guide plate, a carrier member mounted with respect to said base member to have swinging movement in a vertical plane, a coupling pin secured to said carrier member, said base member having an aperture through which said coupling pin is adapted to move, a spring reacting on said carrier member and applying a force to said carrier member in a direction to project coupling pin in said one direction, a locking rod carried by one of said members and in contact with the other of said members to hold said carrier in a cocked position, trigger means responsive to movement of the decoupling mechanism into contiguous, contacting relationship with both aligning wings and the part-cylindrical portion of the positioning plate for moving the locking rod to position to release said carrier member enabling said spring to forcibly move said carrier member and coupling pin with said coupling pin moving through said aperture to engage with the decoupling mechanism, reset means for contacting said carrier to move said coupling pin in an opposite direction and to move said carrier into said cocked position thus to allow said locking rod to move into said cocked position, a ramp pivotally mounted at a first end thereof with respect to said drawbar and extending downwardly and rearwardly of said vehicle to terminate at a second end thereof at a predetermined position normally above the ground, and stop means limiting downward pivotal movement of said ramp with respect to said drawbar; said decoupling mechanism including a main yoke lying in a plane perpendicular to said coupling pin when said trailer and vehicle are hitched and having a flat sheet fixedly mounted on said tongue and first and second retaining plates in contiguous, contacting relation to each other along a plane passing through said coupling pin, each plate lying in contiguous, contacting relation to a forward edge of said sheet, a leading edge of said yoke being of configuration to exactly meet and match with a following edge of each of said aligning wings and of said part-cylindrical portion of said guide plate, one-half of said leading edge being provided by each of said retaining plates, a coupling pin opening being provided in said yoke at the mutual intersection of said first and second retaining plates and said flat sheet to be in aligned relation to said coupling pin when said leading edge of said yoke is in complete, contacting relation to said following edge of said guide plate, adjustable resilient means for normally supporting said retaining plates in contact with said sheet and to tend to resist displacement of said plates by said coupling pin when said pin is in said pin opening and said vehicle is exerting a pull on said trailer through said hitch, and a supporting foot extending downwardly from said main yoke to support said leading edge thereof in spaced relationship to the ground at a height above the predetermined normal position of said second end of said ramp.

9. The combination with a vehicle having a drawbar extending from the rear thereof and a trailer having a forwardly extending tongue capable of swinging movement in a vertical plane; of: an automatic coupling and decoupling trailer hitch consisting of a coupling mechanism mounted on said drawbar and a decoupling mechanism mounted on said tongue; said coupling mechanism including a pivot pin extending vertically and perpendicularly from said drawbar, a guide plate having a part-cylindrical portion pivotally mounted concentric with said pivot pin and a pair of outwardly and forwardly extending radial aligning wings integral with said part-cylindrical portion, a base member lying in a horizontal plane and integral with said guide plate, a carrier member mounted with respect to said base member to have swinging movement in a vertical plane, a coupling pin secured to said carrier member, said base member having an aperture through which said coupling pin is adapted to move, a spring reacting on said carrier member and applying a force to said carrier member in a direction to project said coupling pin in one direction, a locking rod carried by one of said members and in contact with the other of said members to hold said carrier in a cocked position, trigger means responsive to movement of the decoupling mechanism into contiguous, contacting relationship with both aligning wings and the part-cylindrical portion of the guide plate for moving the locking rod to position to release said carrier member enabling said spring to forcibly move said carrier member and coupling pin with said coupling pin moving through said aperture to engage with the decoupling mechanism, reset means for contacting said carrier to move said coupling pin in an opposite direction and to move said carrier into said cocked position thus to allow said locking rod to move into said cocked position, a ramp pivotally mounted at a first end thereof with respect to said drawbar and extending downwardly and rearwardly of said vehicle to terminate at a second end thereof at a predetermined position normally above the ground, and stop means limiting downward pivotal movement of said ramp with respect to said drawbar; said decoupling mechanism including a main yoke lying in a plane perpendicular to said coupling pin when said trailer and vehicle are hitched and having a flat sheet fixedly mounted on said tongue, first and second retaining plates in contiguous, contacting relation to each other along a plane passing through said coupling pin, each plate lying in contiguous, contacting relation to a forward edge of said sheet, a leading edge of said yoke being of configuration to exactly meet and match with a following edge of each of said aligning wings and of said part-cylindrical portion of said guide plate, one half of said leading edge being provided by each of said retaining plates, a coupling pin opening being provided in said yoke at the mutual intersection of said first and second retaining plates and said flat sheet to be in aligned relation to said coupling pin when said leading edge of said yoke is in complete contacting relation to said following edge of said guide plate, a tensioning arm integral with each of said retaining plates and pivotally mounted on said sheet, resilient means urging said tensioning arms in direction to cause said plates to tend to resist displacement by said coupling pin when said pin is in said pin opening and said vehicle is exerting pull on said trailer tongue through said hitch, and a supporting foot extending downwardly from said main yoke to support said leading edge thereof in spaced relationship to the ground at a height above the predetermined normal position of said second end of said ramp.

10. The combination with a vehicle having a drawbar element extending from the rear thereof and a trailer having a forwardly extending tongue element capable of swinging movement in a vertical plane, of: an automatic coupling and decoupling trailer hitch consisting of a coupling mechanism mounted on one of said elements and a decoupling mechanism mounted on the other of said elements; said coupling mechanism including a pivot pin extending vertically and perpendicularly from the element on which it is mounted, a guide plate having a part-cylindrical portion pivotally mounted concentric with said pivot pin and a pair of outwardly and forwardly extending radial aligning wings integral with said part-cylindrical portion, a coupling pin mounted with respect to said guide plate for movement in a vertical plane passing through an axis of said pivot pin; said decoupling mechanism including a main yoke lying in a plane perpendicular to said coupling pin when said trailer and vehicle are hitched said main yoke having a flat sheet fixedly attached to the element on which said decoupling mechanism is mounted and first and second retaining plates in contiguous, contacting relation to each other along said vertical plane passing through said pivot pin and said coupling pin, each retaining plate lying in contiguous, contacting relation to a forward edge of said sheet, a leading edge of said yoke being of configuration to exactly meet and match with a following edge of each of said aligning wings of said end of said part-cylindrical portion of said guide plate, one half of said leading edge being provided by each of said retaining plates, a coupling pin opening being provided in said yoke at the mutual intersection of said first and second retaining plates and said flat sheet to be in aligned relation to said coupling pin when said leading edge of said yoke is in complete, contacting relation to said following edge of said guide plate, and resilient means urging said plates in direction to tend to resist displacement by said coupling pin when said pin is in said pin opening and said vehicle is exerting pull on said trailer tongue through said hitch; said coupling mechanism also including means to cause said coupling pin to move into said coupling pin opening responsive to positioning of said leading edge of said yoke in said complete, contacting relation to said following edge of said guide plate.

References Cited in the file of this patent

UNITED STATES PATENTS

| | | |
|---|---|---|
| 835,666 | Deming | Nov. 13, 1906 |
| 1,702,708 | Slocum | Feb. 19, 1929 |
| 1,798,979 | Grimsrud | Mar. 31, 1931 |
| 2,041,857 | Orner | May 26, 1936 |
| 2,048,310 | Wohldorf | July 21, 1936 |
| 2,671,673 | Benson | Mar. 9, 1954 |
| 2,826,432 | Clever | Mar. 11, 1958 |
| 2,844,390 | Smith | July 22, 1958 |
| 2,937,887 | Richman | May 24, 1960 |